(12) United States Patent
Smith (10) Patent No.: US 6,717,735 B2
(45) Date of Patent: Apr. 6, 2004

(54) LENS STRUCTURES FOR FLUX REDISTRIBUTION AND FOR OPTICAL LOW PASS FILTERING

(75) Inventor: George E. Smith, Cupertino, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 102 days.

(21) Appl. No.: 09/976,181

(22) Filed: Oct. 12, 2001

(65) Prior Publication Data

US 2003/0072083 A1 Apr. 17, 2003

(51) Int. Cl.$^7$ .............................. G02B 27/10
(52) U.S. Cl. ........................ 359/626; 359/619
(58) Field of Search ................. 359/592, 619, 359/626; 362/326

(56) References Cited

U.S. PATENT DOCUMENTS 4,421,398 A * 12/1983 Suzuki et al. ............... 396/150
5,400,114 A * 3/1995 Yoshida et al. ............. 359/457
6,115,181 A * 9/2000 Kelly ......................... 359/618
6,212,012 B1 * 4/2001 Tanaka ....................... 359/624
6,552,760 B1 * 4/2003 Gotoh et al. ................ 349/56
2003/0072083 A1 * 4/2003 Smith ......................... 359/619

FOREIGN PATENT DOCUMENTS

DE    WO 03/016963 A2 * 2/2003 ............ G03B/3/08

* cited by examiner

*Primary Examiner*—David N. Spector (57) ABSTRACT

Lens structures for flux re-distribution and for optical low pass filtering. The lens structure has a surface that includes a seamless profile, which is devoid of cusps. The surface includes a plurality convex elements and concave elements (e.g., an array of alternating elements and concave elements). The convex elements include a positive surface curvature area, and the concave elements include a negative surface curvature area. The lens structure can include a surface for producing a controlled amount of under-corrected spherical aberration and over-corrected spherical aberration.

19 Claims, 7 Drawing Sheets

LENS STRUCTURES FOR FLUX REDISTRIBUTION AND FOR OPTICAL LOW PASS FILTERING

FIELD OF THE INVENTION

The present invention relates generally to lens arrays, and more particularly, to lens structures for flux redistribution and for optical low pass filtering.

BACKGROUND OF THE INVENTION

Lenses of all types may be found in a broad range of applications. A particular use of lenses is in illumination optics. One main purpose of lenses in illumination optics is to confine or direct light into a beam with a controlled angle, thereby directing the light into an intended area of illumination. One way to fulfill this purpose is to ensure that the beam does not have a wide angle.

For example, an office ceiling lamp that is disposed a current cubicle is designed to illuminate a work area (e.g., the desk) in the current cubicle and not an area in a cubicle three cubicles away from the current cubicle.

Another example of a lens utilized in an illumination optics application is an automobile tail light diffuser lens array. The tail light diffuser lens array is designed to confine or direct the light into a beam with a controlled angle, thereby alerting other drivers to slow down.

Prior art lens arrays include a plurality of cells that are arranged in rows and columns and that are disposed adjacent to other cells. Each cell includes a lens element. The array of lens elements generally resembles an egg carton.

Figure 9:
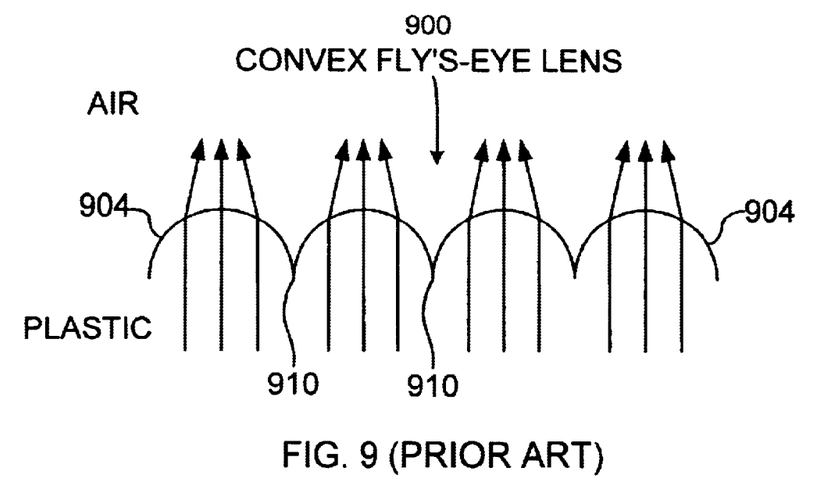
FIG. 9 illustrates a prior art convex fly-eye lens.

One type of lens array is referred to as a convex fly's eye lens array. FIG. 9 illustrates a cross-sectional view of a prior art convex fly-eye lens 900. It is noted that the convex fly's eye lens array includes a plurality of convex lens elements 904.

Figure 10:
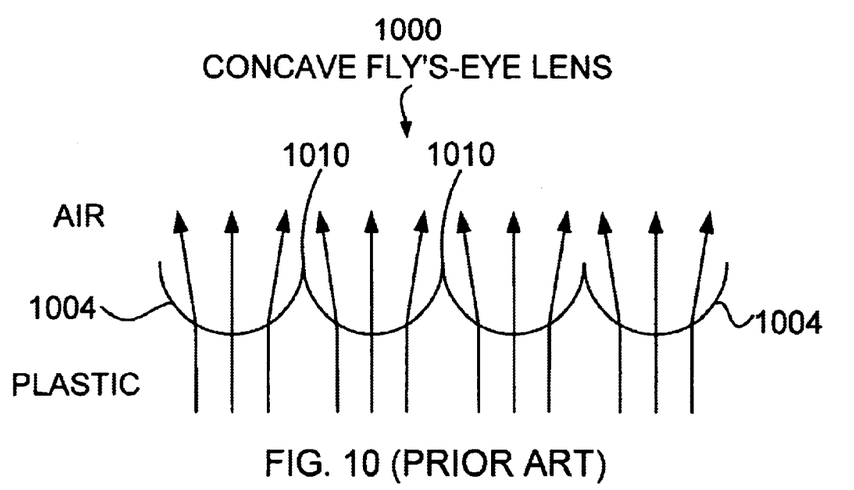
FIG. 10 illustrates a prior art convex fly-eye lens.

Another type of lens array is referred to as a concave fly's eye lens array. FIG. 10 illustrates a cross-sectional view of a prior art convex fly-eye lens 1000. It is noted that the concave fly's eye lens array includes a plurality of concave lens elements 1004. These lenses are called "fly's-eye" because the appearance of the array of lens elements resembles the eyes of a fly.

Unfortunately, these prior art lens arrays suffer from several disadvantages. It is noted that adjacent lens elements form or define a common border there between. These borders are referred to herein as cusps (e.g., cusps 910 and cusps 1010). These cusps scatter light in a forward direction in an un-controllable manner, thereby increasing the chance that the beam misses an intended area of illumination.

Furthermore, these cusps (e.g., cusps 910 and cusps 1010) act as a lossy mechanism in the backward direction. For example, there is a loss in the light flux since a portion of the light is reflected back by these cusps. In other words, when light passes through the cusps, a significant amount of light intensity is lost.

It is noted that as the number of lenses in an array increases, the number of cusps also increases, thereby aggravating the negative effects discussed previously.

The cell size is often reduced to increase the spot density to a point at which the human eye ceases to resolve the spots. The increased spot density leads to a more uniform appearance of the light. Unfortunately, as the size of the cell (e.g., the diameter) decreases, the percentage of the area occupied by the cusps with respect to the area of the cell increases, thereby resulting in more scattered light. Consequently, a higher percentage of light flux is attenuated (e.g., reflected back or scattered) as the dimensions of the cell decrease. This scattering problem caused by the cusps effectively sets a limit on the cell size and cell density.

Accordingly, it is desirable to have a lens structure whose cell dimensions may be reduced without the scattering effects and other negative effects described previously.

Based on the foregoing, there remains a need for a lens that overcomes the disadvantages set forth previously.

SUMMARY OF THE INVENTION

One aspect of the present invention is the provision of a lens structure that is devoid of cusps that exist in prior art fly-eye lenses.

According to one embodiment of the present invention, lens structures for flux redistribution and for optical low pass filtering are provided. The lens structure has a surface that includes a seamless profile, which is devoid of cusps. The surface includes a plurality convex elements and concave elements (e.g., an array of alternating elements and concave elements). The convex elements include a positive surface curvature area, and the concave elements include a negative surface curvature area.

According to another embodiment of the present invention, a lens structure can include a surface for producing a controlled amount of under-corrected spherical aberration and over-corrected spherical aberration. This surface may be employed for filtering applications, such as low pass filtering of digital images. The low pass filtering can occur prior to the light being imaged onto the imaging electronics. The low pass filtering enhances image quality by removing high spatial frequency noise.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION

Lens structures for flux redistribution and optical low pass filtering is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Wave-Eye Lens Structure 100

Figure 1:
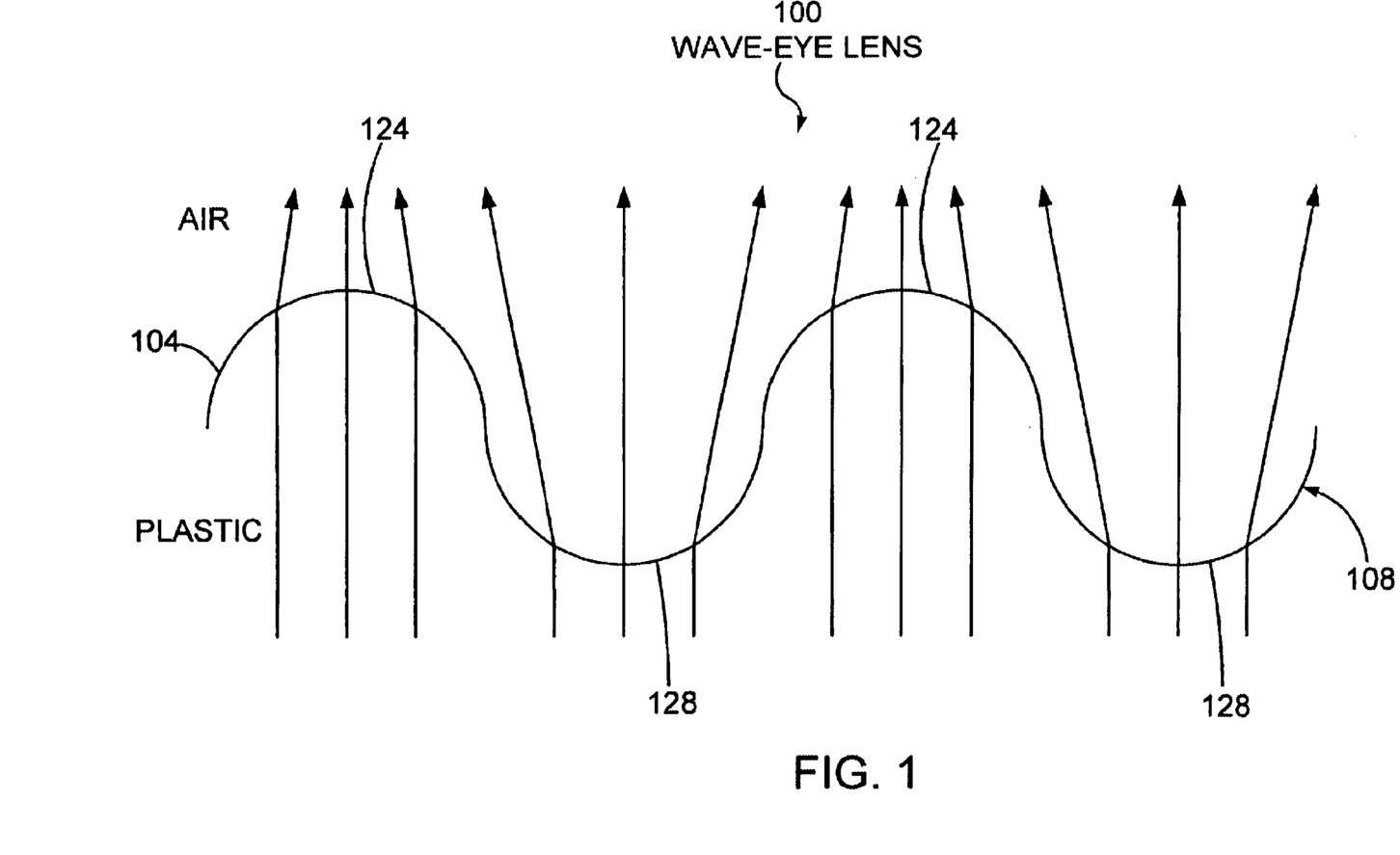
FIG. 1 illustrates a wave-eye lens structure according to one embodiment of the present invention.

FIG. 1 illustrates a wave-eye lens structure 100 according to one embodiment of the present invention. The lens structure includes a surface 104 that is devoid of cusps. The surface 104 can include a seamless profile 108 (i.e., a profile without discontinuities or points at which the slope is undefined). The lens structure with the seamless or continuous profile is referred to herein as a "wave-eye" lens structure.

The surface 104 may include a plurality of convex elements 124 and concave elements 128. For example, the surface 104 can include an array of convex elements 124 and concave elements 128 in a predetermined distribution. The convex elements 124 include a positive surface curvature area, and the concave elements 128 include a negative surface curvature area. The lens structure of the present invention achieves the highly desired aspect of good light intensity transmission with excellent directional control.

One aspect of the present invention is the provision of a lens structure 100 whose surface 104 includes a continuous wave structure. It is noted that the continuous wave structure does not have the cusps, which are present in the prior art lenses. Preferably, the lens structure 100 includes an alternating array of convex and concave elements that result in a surface with alternating positive surface curvature areas and negative surface curvature areas.

By removing the cusps, the lens structure 100 of the present invention may be manufactured with cell sizes that are less than those lenses of the prior art. For example, the lens structure 100 of the present invention can have a cell size of a few mils or even a few microns. Another advantage of the lens structure 100 of the present invention is that the continuous wave structure reduces uncontrolled scatter including backscatter.

It is noted that the flux redirection of the light depends on the slope of the surface 104. In this regard, the surface 104 can include various different profiles to provide a desired redistribution function. In other words, the distribution of the area and slope of the surface 104 can be tailored to achieve a particular redistribution function. The slope of the surface 104 relative to a predetermined slope generally determines the deviation of the light. The area generally determines how much light flux is deviated by each region.

For example, the surface profiles can include, but are not limited to, circular arcs, sinusoids, and general aspheric functions. Furthermore, different profiles can be formed in different directions to make anisotropic properties.

The wave-eye lens structure of the present invention can be advantageously employed in a wide variety of different optics applications. Two exemplary applications are described hereinbelow. The first application is related to flux redistribution for illumination purposes, and the second application is related to low pass filtering applications.

Flux Redistribution For Illumination Applications

As described earlier, the wave-eye lens of the present invention features a surface profile for redirecting the light flux. The slope of the surface profile may be selectively adjusted in the manufacture of the wave eye lens so as to control the flux re-distribution.

It is noted that the surface profile may be adjusted to suit a particular optics application. For example, the surface profile can include, but is not limited to, circular arcs, sinusoids, and aspheric surfaces that may be defined by one or more general aspheric functions.

One application in which the wave lens structure of the present invention may be implemented is a diffuser for indoor lighting. The unique lens structure of the present invention is devoid of cusps, thereby enabling a reduced cell size. It is noted that as the diameter of the cell size decreases, and the height of the lens decreases, as long as the slope of the "hill" is the same, the light distribution through the lens is the same (until diffraction effects come into play). The provision of a non-cusp lens structure allows for cell reduction beyond what was possible by prior art Fly-eye structures.

As noted previously, a thin film may be utilized to make the wave-eye lens structure of the present invention. For example, a Mylar film with a thickness of about 10–20 mils and a bump height of about 1–3 mils may be employed. One mil is equal to 0.001 of an inch.

Another application in which the wave lens structure of the present invention may be implemented is optical imaging lens (e.g., a video camera lens). In this application, the cell size may be on the order of a few mils, and cell height may be on the order of microns. The lens structure of the present invention may be employed use to create a controlled amount of fuzziness or spherical aberration. This lens structure of the present invention is described hereinafter with reference to FIGS. 2–5.

Figure 2:
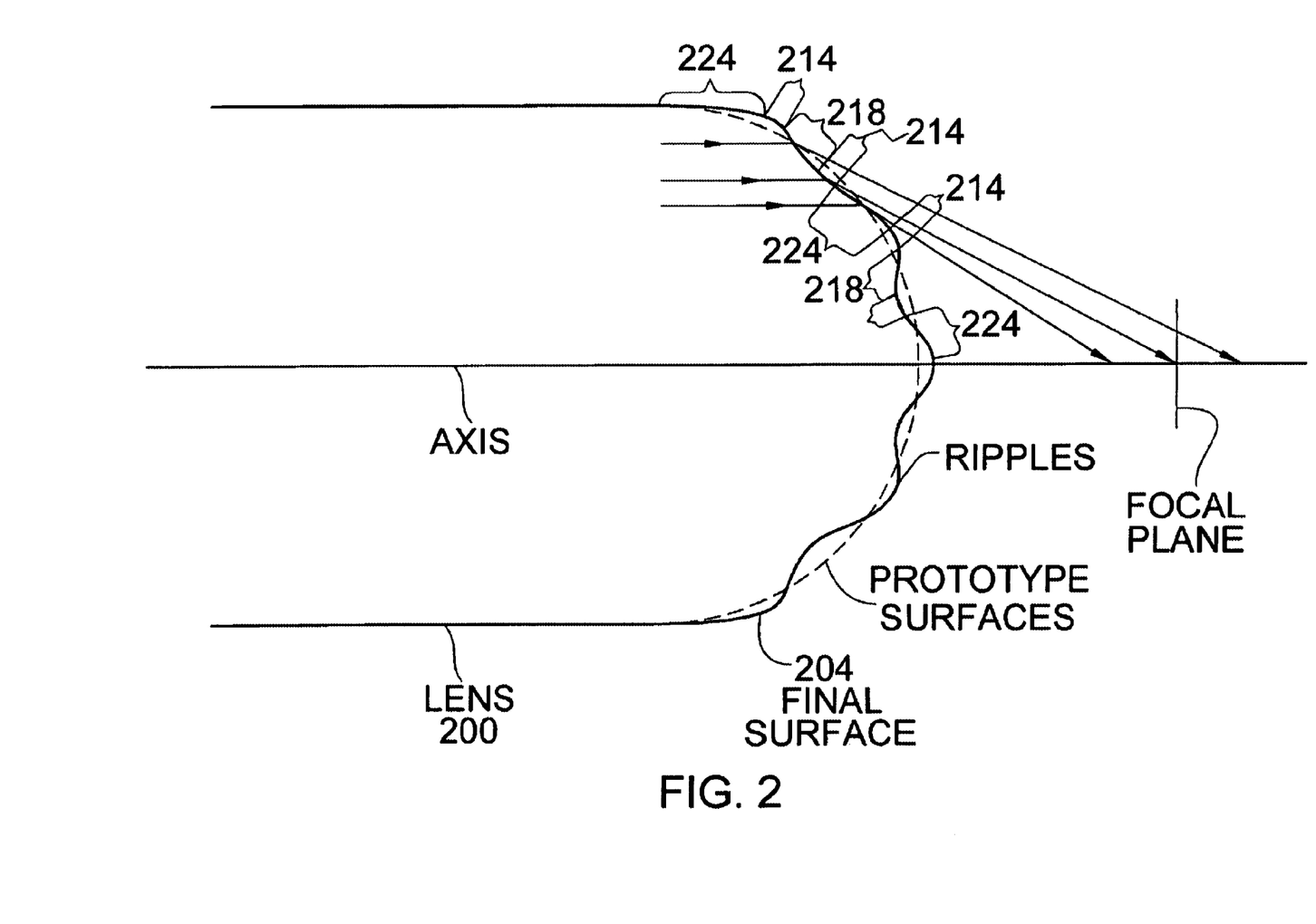
FIG. 2 illustrates a lens element that shows over-corrected zones and under-corrected zones according to one embodiment of the present invention.

FIG. 2 illustrates a lens element 200 that shows over-corrected zones and under-corrected zones according to one embodiment of the present invention. The lens element 200 includes a first surface 204, which can be, for example, a low pass filtered surface that is disposed on one side of the lens. The lens element 200 includes a second surface 208 (shown with a dashed line), which can be, for example, an un-filtered prototype surface.

The final filtered surface 204 is derived from a prototype surface 208 that represents an unfiltered surface. It is noted that the final surface 204 may be disposed on either side of the lens (e.g., disposed on the front or back of the lens). It is noted that the ripples of the final surface 204 are exaggerated for illustrative purposes.

The lens element 200 includes zones 214 with proper correction. These zones 214 are essentially parallel relative to the un-filtered prototype surface 208. Zones 214 are generally areas where there is minimal over-corrected spherical aberration and minimal under-corrected spherical aberration. As described hereinafter, the teachings of the present invention allows a designer to use areas of over-corrected spherical aberration and areas of under-corrected spherical aberration to vary the spot size in a focal plane in a controlled fashion.

The lens element 200 includes areas 218 of over-corrected spherical aberration (referred to herein as over-corrected zones 218) that have a surface slope that is too flat (e.g., having a slope not as steep relative to the based prototype surface 208). The lens element 200 further includes areas 224 of under-corrected spherical aberration (referred to herein as under-corrected zones 224) that have a surface slope that is too steep (e.g., having a slope that is steeper relative to the based prototype surface 208).

The deviation or error between the prototype surface 208 and the final surface 204 may be defined by a mathematical expression. For example, the surface may be defined by an even order (e.g., a $12^{th}$ order) polynomial deviation that is derived (e.g., via integration) from an odd order polynomial (e.g., $11^{th}$ order Chebyshev polynomial). Since the slope of an expression may be determined by performing a derivative of the function, a derivative of the $12^{th}$ order polynomial generates an expression that is the slope of the $12^{th}$ order function. The difference or deviations of the final surface 204 from the prototype surface 208 may be expressed by the polynomial. Furthermore, the amount of deviation or error may be controlled in order to control the spot size.

Since the distance between the lens and the focal plane does not change with different spot sizes, re-design of the prototype surface 208 is obviated. In this manner, the lens of the present invention may be designed for a specific spot size by simply re-designing the ripple pattern (e.g., the deviation function). In other words, the plurality of zones of under-correction and over-correction does not shift the focus of the lens.

The surface may also be defined by other expressions, such as sine functions, cosine functions, and other types of polynomials that may be derived by techniques that are known to those of ordinary skill in the art.

Preferably, the surface is rotationally symmetric about the axis. In this regard, the surface intersects the axis at either a maximum (e.g., peak) or minimum (e.g., trough).

Figure 3:
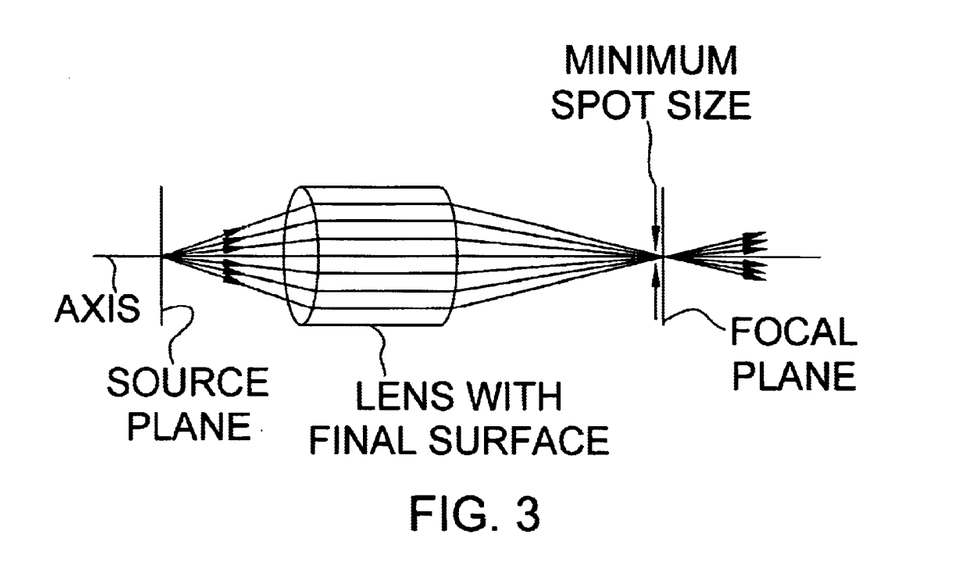
FIG. 3 illustrates a ray plot of the lens structure of FIG. 2 with only the prototype surface.

FIG. 3 illustrates a ray plot of the lens structure of FIG. 2 with only the prototype surface 208. The ray plot corresponds to the lens structure of FIG. 2 prior to the generation of the final surface 204. It is noted that the minimum spot size occurs at the focal plane, and the rays focus at the axis at the focal plane.

Figure 4:
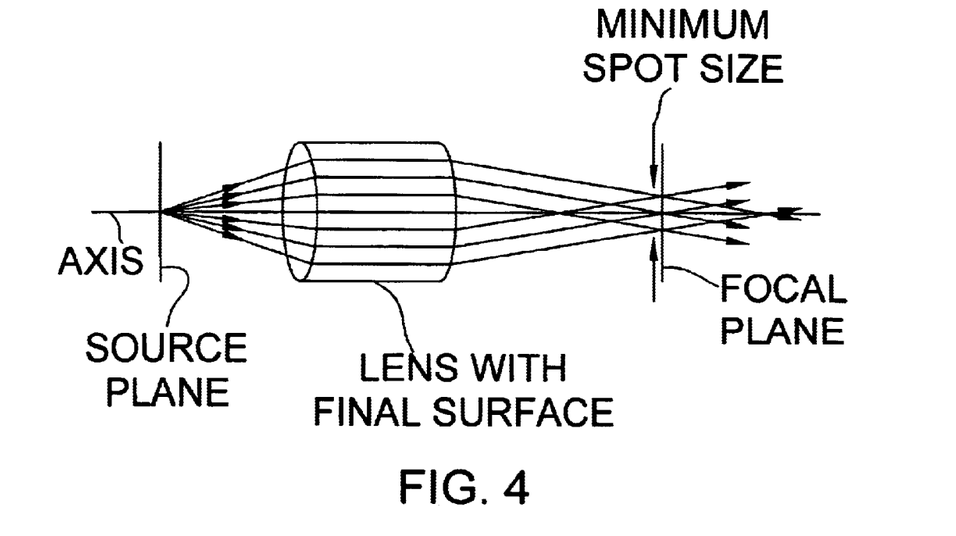
FIG. 4 illustrates a ray plot of the lens structure of FIG. 2 with the final surface that shows over-corrected spherical aberration and under-corrected spherical aberration.

FIG. 4 illustrates a ray plot of the lens structure of FIG. 2 with the final surface 204 that shows over and under corrected spherical aberration. It is noted that the minimum spot size still occurs at the focal plane. The ripples cause some rays to intersect the axis to the left of the focal plane, some other rays to intersect the axis at the focal plane, and certain other rays to intersect the axis to the right of the focal plane.

Figure 5:
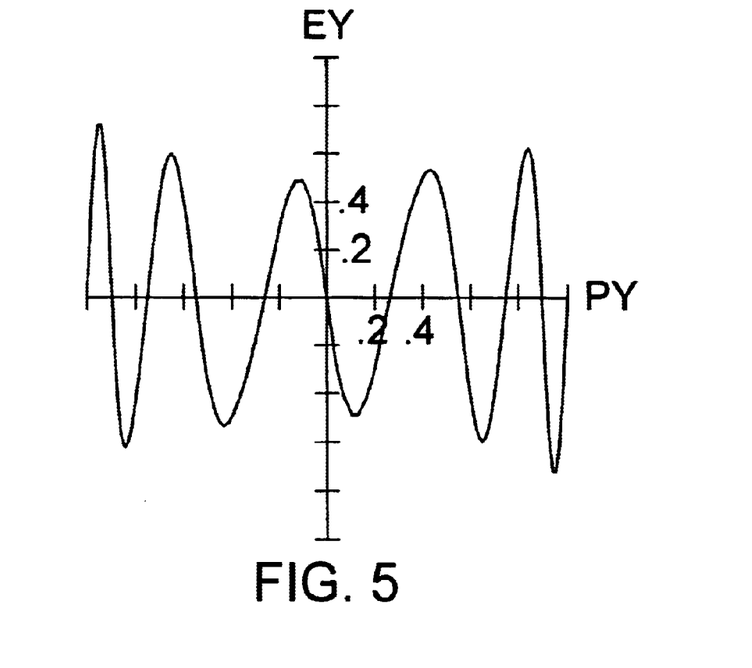
FIG. 5 illustrates a transverse ray aberration plot of the lens structure of FIG. 2 that shows over and under corrected spherical aberration.

FIG. 5 illustrates a transverse ray aberration plot of the lens structure of FIG. 2 that shows over and under corrected spherical aberration. The vertical axis represents a measure of the transverse ray aberration. The horizontal axis represents the radius of the pupil. It is noted that the height of each ripple may be controlled so that the height is the same for each ripple or is generally of a uniform height as shown in FIG. 5. The height of each ripple is important since the height of each ripple affects spot size. As described in greater detail hereinafter, one advantage of the lens of the present invention is that as one stops the lens down, the spot size does not change although the amount of light (or flux) decreases. It is noted that for prior art camera lenses, as one stops the lens down, the spot size changes (e.g., the image gets sharper and aliasing noise is more apparent in the picture).

Figure 6:
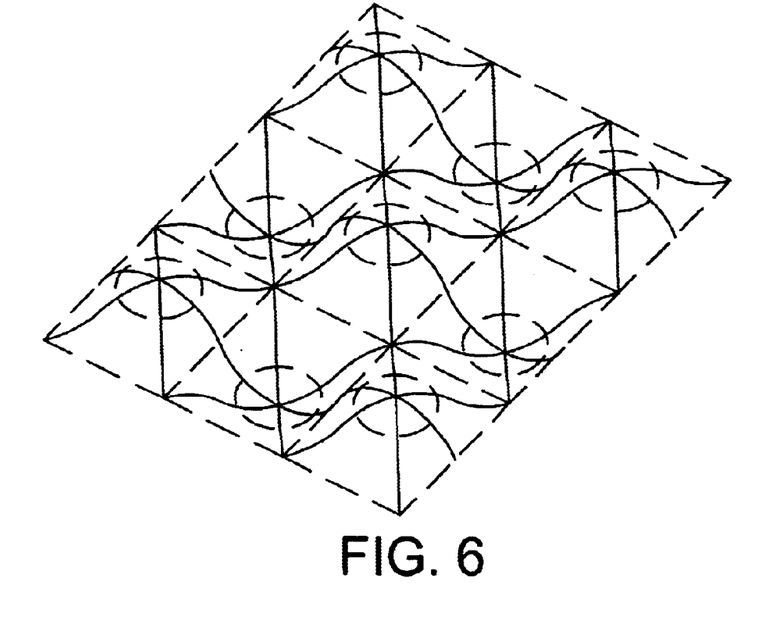
FIG. 6 illustrates a rectangular wave-eye lens structure according to one embodiment of the present invention.

These waves may be applied uni-directionally. Alternatively, two orthogonal waves can be utilized to create a rectangular cell surface as shown in FIG. 6. In another alternative embodiment, three waves at 120 degree angles can be employed to create a close-packed hexagonal array of lenslets that have near circular symmetry as described in greater detail with reference to FIG. 7.

Use of Controlled Spherical Aberration For Filtering

Areas of surface slope error may be introduced at regions within the aperture stop of an imaging system or on a surface in or near the aperture stop location. These areas of surface slope error provide a controlled spherical aberration. Areas of one slope error produce over-corrected spherical aberration (i.e., rays focus too long), while areas of the opposite slope error produce under-corrected spherical aberration (i.e., rays focus too short). It is preferable to have slope errors from zero to a predetermined maximum error in both directions and to have approximately equal areas of opposite error. By following this pattern, there is no change in the optimum focal plane, and the lens produces a minimum geometrical spot size at the nominal focal plane.

According to one embodiment of the present invention, a filtering surface (e.g., a surface for low pass filtering) is disposed at or close to the aperture stop of a well-corrected lens to produce a controlled spherical aberration function. It is desirable that such a corrective filter provides regions of over-corrected spherical aberration and other regions of under-corrected spherical aberration, so that the nominal lens focus position is not altered by the presence of the filter. Preferably, the areas of under correction and over correction are approximately equal and uniformly distributed over the aperture stop surface of the filtered lens.

In one example, the wave-eye structure of the present invention is configured to provide a low pass filter function. For example, the wave-eye structure of the present invention can be configured with suitable equal maximum and minimum surface slopes and with a cell size that is small in relation to the smallest iris opening. In this manner, the wave-eye structure of the present invention flexibly implements a light control iris function without appreciable change in the MTF cutoff frequency set by the filter.

For example, this filtering surface can be added to a previously designed and well-corrected lens. In the case of simple lenses of plastic molded form, the filtering surface can be incorporated onto an existing lens element that is nearest the aperture stop of an image capture system.

For one-dimensional filtering, a simple sinusoidal wave in one direction on the surface can be implemented. It is noted that the profile can distribute the slope versus area function in one or many different proportions.

When two waves at right angles are utilized on the same surface, the resulting surface is similar to a checkerboard, where the black squares represent negative lenses, and the red squares represent the positive lenses. It is noted that the horizontal directions and the vertical directions satisfy the requirement of alternating polarities. However, it is further noted that along the diagonals, there is a line of lenses that have the same polarity.

To achieve the cuspless topography of the lens structure of the present invention, the corners of the cells are preferably configured as zero slope regions. In this regard, it is important that the diagonal profile of the lenses to differ from the directions parallel to the wave directions.

Figure 7:
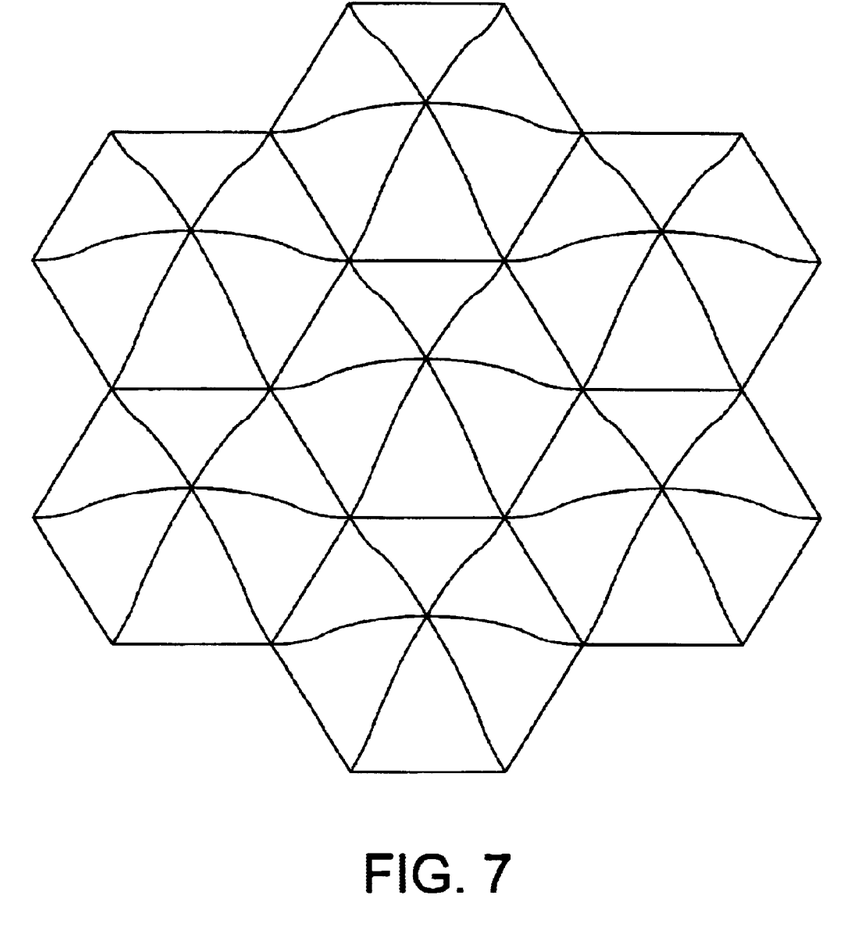
FIG. 7 illustrates a hexagonal wave-eye lens structure according to one embodiment of the present invention.

FIG. 7 illustrates a hexagonal wave-eye lens structure according to one embodiment of the present invention. Each cell can include a lens element that has an approximately circular zone of maximum slope that produces maximum spherical under-correction at one edge and maximum over-correction at the opposite edge.

The parity requirement is more stringent for the hexagonal close-packed array of three intersecting rays. For example, the parity requirement for each of the three intersecting rays requires that the hexagonal perimeters of the lens cells belong to a single planar surface. Furthermore, the wave structure may be maintained along the three 120 degree wave axes when each hexagonal cell includes a full wave. In this embodiment, the center of each cell and the periphery of each cell have a zero slope, and the cells all have the same polarity.

Inside this circular zone, the slope reduces to zero at the cell center. Outside the zone, the slops reduce to zero at the cell periphery. The cell has the property that no matter what the shape of the cross section of the cell, provided that cross section is symmetric about the center, there are equal areas with positive slope errors and negative slope errors of the same magnitude. The equal areas with positive slope errors and negative slope errors of the same magnitude satisfy the requirement for no focal shift.

This wave-eye surface may be implemented at scales of a few microns with slope errors producing any prescribed amount of spherical aberration. An advantage of this structure is that the structure is highly impervious to variation of the MTF cutoff frequency with aperture size. For example, stopping down the lens simply reduces the number of lenslets within the aperture, but the lens generates the same spot size function.

Exemplary Lens Applications

Figure 8:
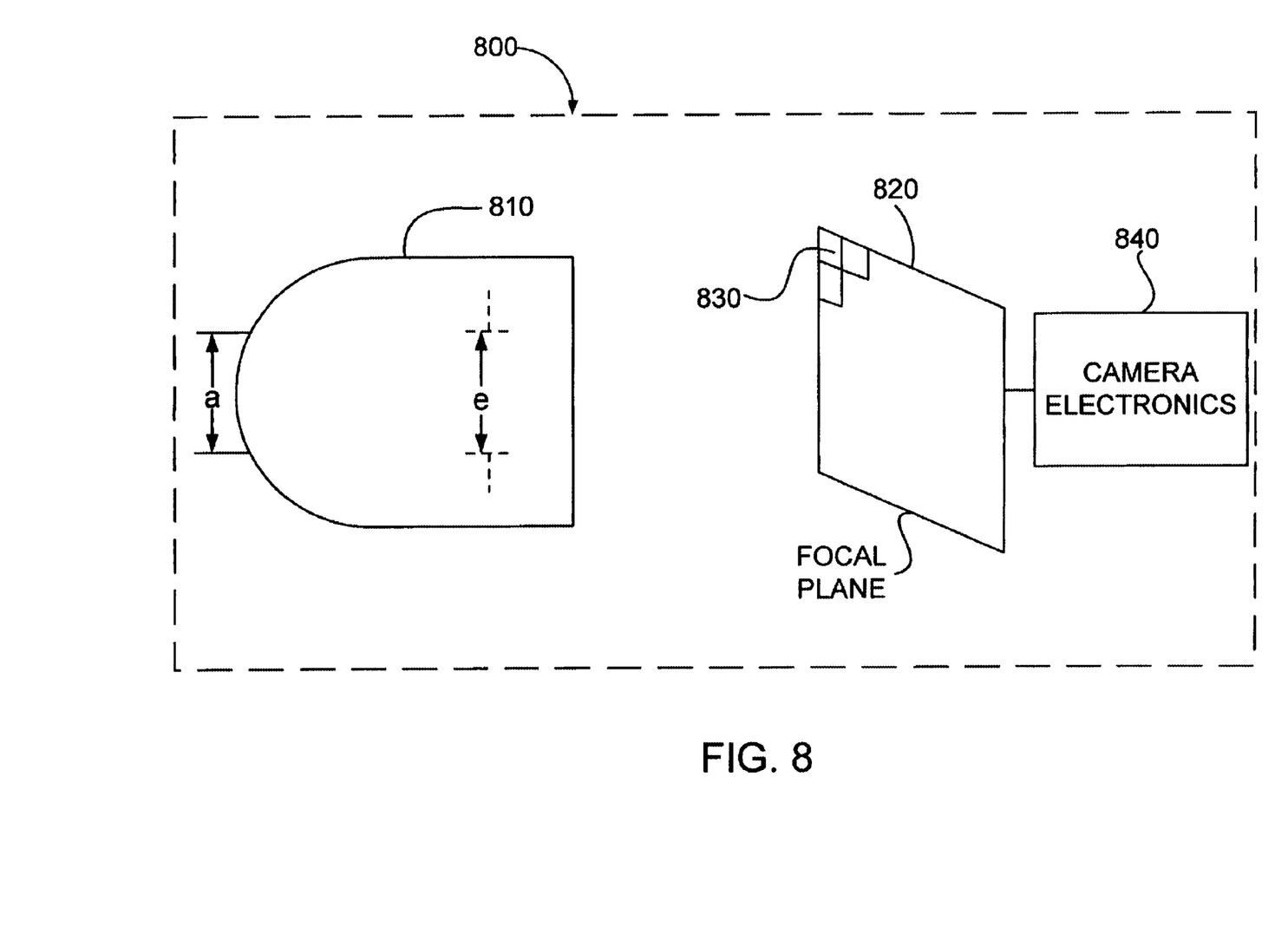
FIG. 8 illustrates a simplified block diagram of an image capture device in which the lens structures of the present invention can be implemented.

The wave eye lens of the present invention can be utilized for low pass filtering applications. One device that requires low pass filtering is a digital image capture device (e.g., a digital video camera or a digital still camera). FIG. 8 illustrates a simplified block diagram of an image capture device in which the lens structures of the present invention can be implemented.

In this example, the lens structures of the present invention can be implemented for low pass filtering purposes. The image capture device 800 includes optics 810 for receiving light and a detector array 820 of detectors 830 (e.g., a CCD array or CMOS array) for converting the light into corresponding digital signals representative of the image captured. Camera electronics 840 is coupled to the detector array 820 for performing signal processing of the captured image. The image capture device 800 acts as a sampling device for sampling picture or image information in space. The sampling rate of the device 800 is dependent on the size and spacing of the detectors (also referred to herein as pixels). For example, when the centers of the detectors are spaced at 10 microns, the sampling rate is 100 samples per millimeter.

A well-known physical principle, known as the Nyquist criteria, states that when the information to be captured contains frequencies that are greater than one-half the sampling rate of the device, the resulting captured image will contain artifacts or false information. For example, if the device 800 samples at a rate of 100 pixels per mm, and the picture contains information that are greater than 50 pixels per mm, then there are erroneous picture information contained in the picture. Furthermore, these errors or artifacts cannot be removed from the picture. Unfortunately, these artifacts render the captured image with noticeable noise or other undesirable and unsightly features.

Consequently, one design consideration for digital image capture devices is to ensure compliance with the Nyquist criteria. Typically, optics is employed to filter out the high frequency information so that the information presented to the detector array 820 meets the Nyquist criteria.

It is noted that the wave eye lens of the present invention provides a low-cost, functional, anti-aliasing filtering features without having to use expensive birefringent materials (e.g., crystalline structure).

An array of wave-eye lenses controls the amount of light passing through each lens without changing the frequency response of the lens. In the prior art cameras, as one stops down the aperture, the picture becomes sharper. In contrast, the lens of the present invention controls the fuzziness (e.g., the spot size) independent of aperture size.

The filtering is performed independent of aperture size by employing a first portion of a lens for creating over-corrected spherical aberration and a second portion of the lens for creating under-corrected spherical aberration.

In an exemplary imaging lens application, the wave-eye surface of the present invention is preferably placed in the plane of an aperture stop (a). The aperture stop is imaged as the exit pupil (e) of the lens with some magnification that is given by: e/a.

It is noted that for lenses with significant diffraction effects that control the actual spot sizes, the slopes of the wave-eye surface may be determined from optical path difference measurements and diffraction considerations.

Ray and surface slopes are reduced by the same magnification at the exit pupil. A surface slope error at the exit pupil results in a ray angle error of approximately $(n-1)/n$ times the surface error. This angle is the angular spherical aberration produced by the surface and results in a geometrical spot size error that is obtained by multiplying the angular error at the exit pupil by the focal length of the lens.

The required geometrical spot size leads to the required ray angle error at the exit pupil. In turn, the required ray angle error at the exit pupil leads to the required maximum slope error produced by the wave-eye surface.

With lenses of very wide angle, there exists an obliquity variation of the refraction by the surface, thereby leading to a field variation of the spot size. In these cases, the wave surface of the present invention is preferably applied to a different surface of the lens, where the principal ray incidence angles are less.

A lens for a typical CMOS VGA resolution imaging lens has a focal length of about 5 mm. The fully open iris may have a diameter of about 2 mm, and the smallest aperture setting has a diameter of about five times smaller than the fully open diameter (e.g., about 0.4 mm). At the smallest aperture setting, the diameter of the wave cell is preferably no more than the aperture diameter so that the diameter of the wave cells are about 0.4 mm or smaller.

When a geometrical spot radius of 5 microns is desired, the ray slope errors at the exit pupil needs to be a maximum of about 1 milliradian (mr). For example, in an f2 lens, the exit pupil is about 1.25 mm in diameter or 5/8 times the iris diameter. The ray slope errors at the aperture stop is about 1.25 mr, and the surface slope errors are about three times the ray slope error or about 3.75 mr. When a sinusoidal wave profile is employed, the maximum slope is pi times the ratio of total wave height to wavelength. At a 400 micron cell diameter, the total lens height is about 0.5 micron.

It is noted that the required slope perturbations can be placed on a separate flat surface. Alternatively, the required slope perturbations can be added to a base profile of an existing surface in an appropriate location. The fabrication of a flat film may be performed by a rolling process with a suitably tooled roller. Alternatively, the fabrication can utilize an etching process or deposition process. For simple plastic lenses, the required profile can be added to a molding tool.

Compared to the prior art, the lens structure of the present invention has the important benefit of providing flux re-distribution without the size barriers and uncontrolled scatter inherent in prior art fly-eye lenses. Moreover, the lens structure of the present invention can provide optical filtering without dependence on f-number.

The lens structure of the present invention that includes a seamless or continuous profile addresses the problems of loss of light intensity (i.e., attenuation of light flux) and of uncontrolled flux direction inherent in prior art lenses. By removing the cusp regions, the lens structure of the present invention reduces the light that is reflected back to the source by the lens material and also reduces the amount light that is scattered in the forward direction in an un-controlled manner.

It is noted that the shape of the lens (e.g., a concave lens or a convex lens) has a curvature that is made up of a plurality of segments of different slopes. The slope of a particular segment controls how light flux passing therethrough is re-directed. For prior art lenses, as the curvature approaches the location of the cusps, the re-directing ability of the lens is very poor because the slopes near or at the cusp areas do not have a defined slope. In other words, it is very difficult if not impossible in prior art lens structures to design the cusp regions to have a particular slope in order to achieve a particular and controlled re-direction. Consequently, the cusp regions in prior art lenses often re-direct the light flux passing there through to an unintended direction and location.

Another advantage of the lens structure of the present invention is that the amount of material (e.g., plastic) used in the lens may be reduced. For example, prior art fly-eye lenses may have a thickness in the range of 0.25 to 1 inch, whereas the wave-eye lens of the present invention may have a thickness in the milli-inch range (e.g., 20 mils).

In the foregoing specification, the invention has been described with reference to specific embodiments thereof. It will, however, be evident that various modifications and changes may be made thereto without departing from the broader scope of the invention. The specification and drawings are, accordingly, to be regarded in an illustrative rather than a restrictive sense.

What is claimed is:

1. A lens structure comprising:
a surface devoid of cusps that includes a seamless profile;
wherein the surface includes a plurality of convex elements and concave elements; and
a filtering surface for producing a controlled amount of spherical aberration.

2. The lens structure of claim 1 further comprising:
a plurality of cells;
wherein the convex elements include a positive surface curvature area and wherein the concave elements include a negative surface curvature area; and
wherein the cells include an array of alternating convex elements and concave elements.

3. The lens structure of claim 2 wherein each cell includes a rectangular shape.

4. The lens structure of claim 2 wherein each cell includes a hexagonal shape.

5. The lens structure of claim 1 wherein the surface includes a continuous wave structure.

6. The lens structure of claim 2 wherein each cell includes at least two orthogonal waves.

7. The lens structure of claim 2 wherein each cell includes at least three waves that are separated by 120 degrees.

8. The lens structure of claim 1 wherein the lens structure includes a plurality of close packed hexagonal array of lenslets that include near circular symmetry.

9. The lens structure of claim 1 wherein the filtering surface includes at least a first region for producing over-corrected spherical aberration and at least a second region for producing under-corrected spherical aberration.

10. The lens structure of claim 9 wherein the first region has a first slope error and the second region has a second slope error.

11. The lens structure of claim 1 wherein the filtering surface includes a plurality of first regions for producing over-corrected spherical aberration and a plurality of second regions for producing under-corrected spherical aberration: wherein the first regions and the second regions are approximately equal in area and wherein the first regions and second regions are uniformly distributed over the filtering surface.

12. The lens structure of claim 1 wherein the filtering surface performs low pass filtering.

13. The lens structure of claim 1 wherein the surface profile includes one of a plurality of circular arcs and a plurality of sinusoids.

14. The lens structure of claim 1 wherein the surface profile includes at least one aspheric function.

15. A lens structure comprising:
a plurality of cells;
wherein each cell includes a surface that is devoid of cusps and that includes a seamless profile;
wherein the cells includes include at least one convex element and at least one concave element; and
wherein the surface produces a controlled amount of under-corrected spherical aberration and over-corrected spherical aberration.

16. The lens structure of claim 15
wherein the convex element includes a positive surface curvature area and wherein the concave element include a negative surface curvature area; and
wherein the cells include an array of alternating convex elements and concave elements.

17. A lens structure comprising:
a surface that includes at least a first region for producing over-corrected spherical aberration and at least a second region for producing under-corrected spherical aberration;
wherein the surface produces a controlled amount of under-corrected spherical aberration and over-corrected spherical aberration.

18. The lens structure of claim 17 wherein the surface is for performing a filtering function.

19. The lens structure of claim 17 wherein the surface is derived from a prototype un-filtered surface.

* * * * *